United States Patent Office 3,268,310
Patented August 23, 1966

3,268,310
2-DIOXANONE-TREATED CHARCOAL
Joseph M. Baggett, Freeport, Sammy D. Tatum, Clute, and Elmer L. Pendleton, Lake Jackson, Tex., assignors to The Dow Chemical Company, Midland, Mich., a corporation of Delaware
No Drawing. Filed Nov. 26, 1963, Ser. No. 326,263
3 Claims. (Cl. 44—6)

This invention relates to charcoal such as is used in fireplaces, grill arrangements, and the like for charcoal cooking and more particularly to such charcoal which has been impregnated with poly-2-p-dioxanone.

Charcoal is a favorite fuel for specialty cooking which is generally done over a grill type arrangement. However, charcoal has the disadvantage that it requires some means for igniting such as a liquid igniter or tinder, and it further has the disadvantage that it is characteristically dusty due to the black charcoal powder produced by self-contact of the individual charcoal pieces. It would be advantageous to have a dustless charcoal which is easily ignited by simply applying a flame thereto.

Such a charcoal can be prepared according to the present invention by impregnating the charcoal with poly-2-p-dioxanone. The impregnating or coating of the charcoal can be done by dipping or otherwise coating the charcoal pieces or briquettes with the polydioxanone. The polydioxanone can be prepared by adding a catalystic amount, suitably about 0.01 to 0.1% by weight of a Lewis acid or mineral acid catalyst to 2-p-dioxanone. Of the Lewis acid type catalysts, $BF_3$ has proven to be of particular value and of the mineral acids, sulfuric acid has proven to be of particular value. While the reaction proceeds at room temperature or lower, heat accelerates the polymerization, and consequently, the polymerization reaction is preferably run at ambient temperature. An alternate method for coating the charcoal with polydioxanone, which method produces charcoal with a deeper penetration of the polydioxanone consists of mixing the catalyst with monomeric 2-p-dioxanone and immediately dipping the charcoal. Thus, the charcoal is saturated with the catalyzed dioxanone, which catalyzed compound proceeds to polymerize in place upon the charcoal.

Besides the desirable characteristics of being easily ignited, remaining relatively dry when exposed to water, and being dustless, the charcoal can be further modified for aesthetical and the like purposes. If color is desired, the coating mixture can have a non-toxic coloring material added thereto which upon coating the charcoal, will leave it with an appearance different than its natural black. If scent is desired, this can be achieved by adding the desired constituent to the coating. Hickory scent, for example, can be added by applying the coating having admixed therewith pulverized hickory sawdust. The poly-p-dioxanone itself burns off cleanly and leaves no odor or flavor to contaminate the food being grilled.

Example 1

To 100 grams of 2-p-dioxanone were added 0.1 gm. of concentrated sulfuric acid. Charcoal briquettes were immediately dipped therein, removed and allowed to stand while the polymerization of the dioxanone proceeded. After 1 hour a coated briquette was ignited by means of a match whereupon a low blue flame, representing the burning of the poly-2-dioxanone, appeared for approximately 30 minutes over the surface of the briquette. After the blue flame diminished, the briquette remained a glowing odorless coal.

Example 2

To 100 grams of 2-p-dioxanone were added 0.1 gm. of concentrated sulfuric acid. The catalyzed dioxanone was allowed to stand for approximately ½ hour. Charcoal briquettes were coated with the polydioxane thus prepared by melting the polymer at about 105° C. and dipping the briquettes therein. The same characteristics as above were noted for the treated briquettes with the exception that penetration of the briquette by the polydioxanone was not as great.

The poly-2-p-dioxanone can be similarly applied to natural charcoal lumps as distinguished from artificial molded briquettes with similar results in improved properties.

Another technique of using the invention is to use the poly-2-p-dioxanone as a binder in making charcoal briquettes. For this purpose one can spray or otherwise apply the catalyzed monomer or the molten polymer or a solution or dispersion of the polymer to the charcoal powder and then mold the briquettes from the thus treated powder.

While the proportion of poly-2-p-dioxanone used with charcoal is not critical, about 5–50% by weight, based on the charcoal, is ordinarily suitable.

We claim:
1. A composition of matter consisting essentially of charcoal and an amount of poly-2-p-dioxanone sufficient to substantially reduce the normal dustiness and improve the ease of ignition of the charcoal, said amount not exceeding 50% by weight, based on the charcoal.
2. A composition as defined in claim 1 containing 5–50% by weight of the dioxanone, based on the charcoal.
3. A charcoal briquette containing poly-2-p-dioxanone in an amount sufficient to substantially reduce the normal dustiness and improve the ease of ignition of the briquette, said amount not exceeding 50% by weight, based on the charcoal.

References Cited by the Examiner

UNITED STATES PATENTS

| | | | |
|---|---|---|---|
| 2,962,506 | 11/1960 | Brusie | 260—340.6 |
| 3,020,289 | 2/1962 | Weipert | 260—78.3 X |

DANIEL E. WYMAN, *Primary Examiner.*

C. F. DEES, *Assistant Examiner.*